US011593845B1

(12) United States Patent
Bork et al.

(10) Patent No.: US 11,593,845 B1
(45) Date of Patent: Feb. 28, 2023

(54) USER INTERACTIVE WRAPPER FOR MEDIA CONTENT

(71) Applicant: Amazon Technologies, Inc., Seattle, WA (US)

(72) Inventors: Kelly Bork, Seattle, WA (US); McKenzie Lee Eggers, Salt Lake City, UT (US); Nir Sheep, Kirkland, WA (US); Paul A. Kotas, Seattle, WA (US); Alexei Pineda, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 17/205,399

(22) Filed: Mar. 18, 2021

(51) Int. Cl.
*G06Q 30/02* (2012.01)
*G06Q 30/0241* (2023.01)
*G10L 15/22* (2006.01)
*G06Q 30/0601* (2023.01)
*G10L 15/07* (2013.01)
*G06Q 30/0251* (2023.01)

(52) U.S. Cl.
CPC ..... *G06Q 30/0276* (2013.01); *G06Q 30/0269* (2013.01); *G06Q 30/0277* (2013.01); *G06Q 30/0643* (2013.01); *G10L 15/07* (2013.01); *G10L 15/22* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 2004/0088328 A1* | 5/2004 | Cook | G06F 16/48 |
| 2008/0177819 A1* | 7/2008 | Reshef | G06Q 30/02 709/201 |
| 2009/0204664 A1* | 8/2009 | Yovin | H04N 21/458 709/203 |
| 2013/0073983 A1* | 3/2013 | Rasmussen | G06Q 30/02 715/753 |
| 2013/0238426 A1* | 9/2013 | Mukhopadhyay | G06Q 30/02 705/14.49 |
| 2014/0129668 A1* | 5/2014 | Greenzeiger | G06Q 30/02 709/217 |
| 2015/0073921 A1* | 3/2015 | Vasudevan | H04H 60/375 705/14.72 |
| 2018/0144750 A1* | 5/2018 | Storti | H04H 20/31 |
| 2018/0197575 A1* | 7/2018 | Doherty | G06Q 30/0276 |
| 2019/0355372 A1* | 11/2019 | Bittner | G10L 21/013 |
| 2020/0321005 A1* | 10/2020 | Iyer | G10L 15/193 |
| 2021/0042796 A1* | 2/2021 | Khoury | G06Q 50/01 |

* cited by examiner

*Primary Examiner* — Vincent M Cao
(74) *Attorney, Agent, or Firm* — Eversheds Sutherland (US) LLP

(57) ABSTRACT

Devices and methods are provided for using an interactive wrapper for media content. A method may include identifying, by a first device, a software container including a call to action. The method may include identifying non-interactive advertising content. The method may include generating an interactive advertisement by adding the advertising content to the software container, and sending the interactive advertisement to a second device for presentation. The method may include receiving an indication of a user interaction with the interactive advertisement, and determining, based on the user interaction, an action. The method may include sending data associated with the action to the second device or a third device for presentation.

20 Claims, 6 Drawing Sheets

USER INTERACTIVE WRAPPER FOR
MEDIA CONTENT

BACKGROUND

People increasingly are using more devices. However, content presented using different devices may not be formatted to allow user interaction. For example, digital and radio advertisement creatives may not allow for user interaction with the advertisement creatives. There is therefore a need for interactive content to be presented using devices.

Figure 1:
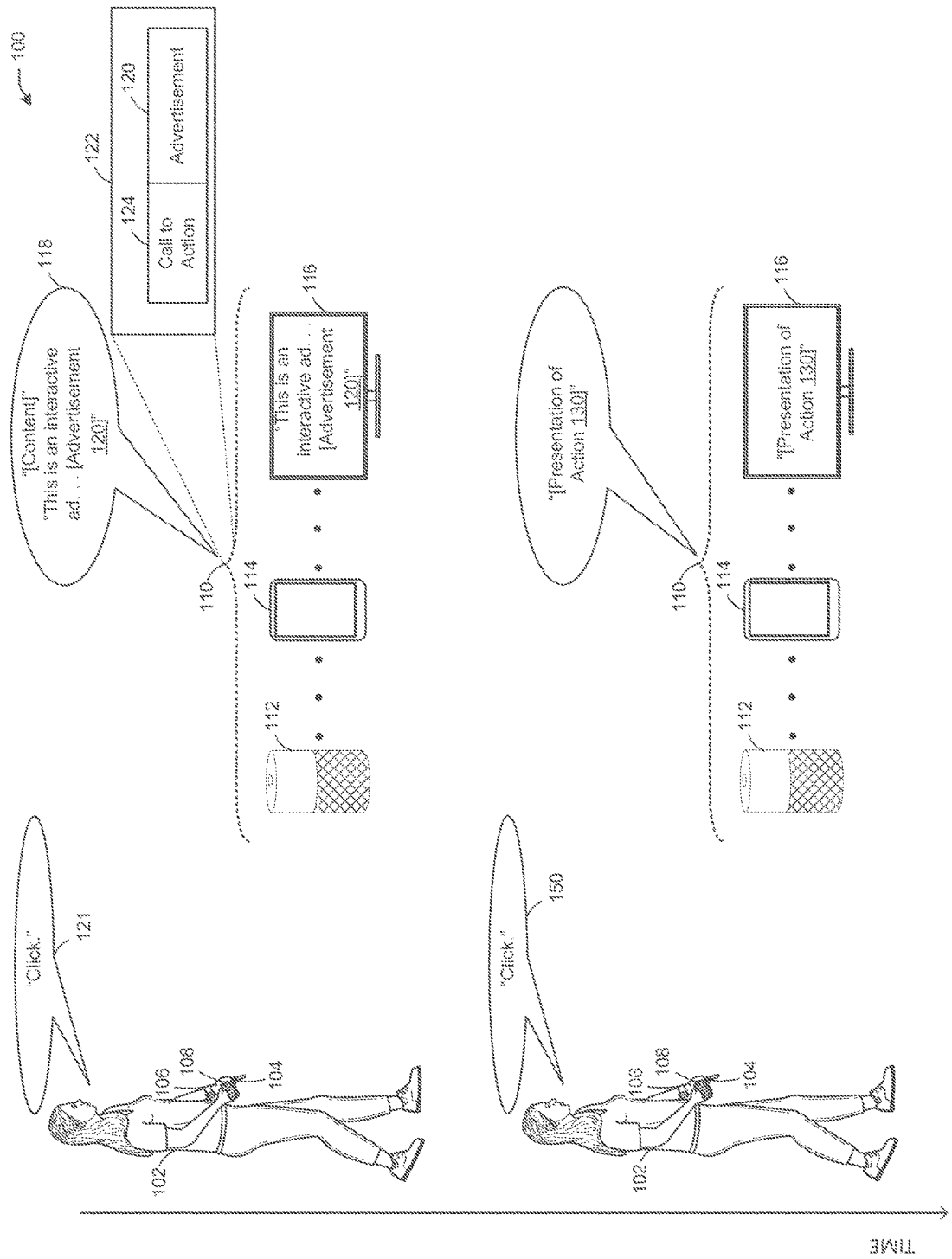
FIG. 1 illustrates an example system for using an interactive wrapper for media content, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for a user interactive wrapper for media content.

Many types of content, particularly advertisement creatives, do not allow for user interaction with the content. For example, some digital and radio advertisement do not allow for a user to interact with the advertisements. In particular, some advertisement creatives lack an interactive call to action (e.g., to indicate that an advertisement is interactive and to prompt a user interaction with the advertisement). Some advertisements may include a call to action, but the call to action may allow for a user interaction with the advertisement. For example, a user may see or hear an advertisement, and react by subsequently calling a phone number or visiting a webpage mentioned in the advertisement, but such user actions are not interactions with the advertisement.

Some advertisements may be altered to allow for user interaction. For example, a web advertisement may embed links so that, when the advertisement is clicked or otherwise selected by a user, a device of the user is directed to a webpage or other application. However, requiring and advertisement to include an interactive call to action may not be desirable.

In particular, the need to generate or alter an advertisement creative to allow for user interaction may be undesirable, may limit the actions that may be performed by devices based on the user actions, and may require a user to memorize many types of user interactions with interactive advertisement creatives. There is therefore a need for a user interactive wrapper for media content.

In one or more embodiments, advertisement or other content that does not include an indication that the content is interactive (e.g., an audio advertisement that does not include an interactive call to action) may be used to generate an interactive advertisement creative without having to alter the content. To render a content of a non-interactive advertisement creative available for user interaction, a device may "wrap" the content using a container (e.g., software applications, software dependencies of the applications, libraries, configuration files, etc.). In particular, with a pre-generated wrapper, a user may add an existing file (e.g., an audio file with advertisement content) into the wrapper, resulting in a wrapped, interactive advertisement creative that uses and does not alter a non-interactive advertisement. In this manner, the wrapping of content may be distinguished from altering the content (e.g., changing the code of a video or image file to add interactive audio or to embed a link). For example, an audio file may be wrapped with a container that includes a call to action that may precede and/or follow the advertisement creative. Because the container used to wrap the audio file may include an interactive call to action (e.g., audio or video) to introduce the audio file as an advertisement and audio or video to inquire about a user's interest in the content of the audio file, the wrapper may allow for user interaction with the audio file without altering the content of the audio file (e.g., without embedding a link or adding audio, video, or text to an advertisement creative). An example may include a first portion of the wrapper playing a voice introduction: "This is an advertisement," followed by presentation of the audio file, followed by a second portion of the wrapper with a voice inquiry (e.g., call to action): "Just say '[action]' to engage." When the user says the "action" word (e.g., "Yes," "Continue," or the like), a device may respond by performing one or more actions as described further herein. In this manner, an audio file (e.g., a .mp3 or .mp4 file), such as an audio file used in a radio advertisement, may be converted to an interactive advertisement using wrapping and without altering the content of the audio file.

In one or more embodiments, the interactive call to action may vary. For example, the first time that the interactive call to action is presented as part of a wrapped advertisement, the interactive call to action may include audio, video, and/or text to explain that a person may respond to the interactive call to action using a voice response, a gesture, a click or touch, or the like. In this manner, the interactive call to action may inform a user that an advertisement is interactive, and the ways that the user may interact with the advertisement. A second time that an interactive wrapped advertisement is presented, the call to action may be different, such as a sound (e.g., a beep or a tone, etc.), a presented light (e.g., the light indicative of the advertisement being interactive), or a shorter audio, video, and/or text indicator (e.g., "Would you like to hear more," Are you interested," etc.). The way that a call to action may be presented may be based on user preferences and/or user interaction history (e.g., whether the user responded to one type of call to action versus another type of call to action, etc.). In this manner, a non-interactive advertisement may be wrapped with a container including a call to action or another indicator that the advertisement is interactive, allowing a user to identify and interact with the advertisement.

In one or more embodiments, a user interaction with a wrapped advertisement creative may include a voice utterance responding to an inquiry or invitation to continue, learn more, purchase a product, or the like, as provided by the wrapper. Alternatively or in addition, a user's interaction may include a touch, click, gesture, or the like. For example, the wrapper may invite a user to click a link, button, screen, or another object, gesture to indicate whether or not to continue, or to remain silent for a time period.

In one or more embodiments, in response to a user interaction (or lack thereof) with a wrapped advertisement creative, a device may determine one or more additional actions to be performed by the device and/or by one or more other devices. For example, content such as images, video, audio, links, messages, and the like may be presented using the device and/or by one or more other devices. For example, when a user is listening to audio using the device and the device presents the wrapped advertisement creative, and when the user interacts in a way that indicates the user's interest in learning more, the device may continue to present the audio to which the user was listening while another device may present additional information/data about the content presented in the advertisement creative. In this manner, after the advertisement creative, the user's listening to the audio is no longer interrupted (at least for a time).

In one or more embodiments, the actions that a device may perform in response to a user interaction (or lack thereof) may include a variety of actions. The device or another device may purchase a product, add a product to a virtual shopping cart, present links, present messages, present additional media, add user subscriptions, apply cost savings/discounts, present games or other interactive content, execute applications, and the like in response to a user's interactive response to a wrapped advertisement creative. Which data to present and on which devices may be based on a specific user interaction (e.g., the user may request a particular device with which to be presented more information from an advertisement creative) or may be determined by a device based on user preferences, content types and formats (e.g., video content may be presented on a device with a display, audio may be presented using a device capable presenting audio, product pages may be presented on a device capable of displaying them, etc.), available devices, the type and/or format of content being presented to the user before the advertisement creative was presented (e.g., when the user is listening to music or watching a video on one device, the follow-up action may include presentation on a different device to avoid further interruption of the music or video), and/or other criteria. Multiple actions may be performed responsive to any user interaction with interactive advertisement content, and the selection of which actions to be performed (e.g., which content to present, in which format, and using which device of multiple available devices for presentation) may be based the interaction with the advertisement in response to an indicator that an advertisement is interactive. For example, if a non-interactive advertisement were presented without the software container, a user response such as a voice utterance or gesture may result in no additional actions performed. The inclusion of the non-interactive advertisement in the software container therefore allow for the advertisement to become interactive.

In one or more embodiments, the containers may be pre-generated to allow for a media file to be added to the container. In this manner, the container may be presented with a single media file rather than requiring a sequence of media files to be presented. The process of rendering any advertisement actionable (e.g., user interactive) may be simplified by allowing for the inclusion of a media file in a container to generate a wrapped advertisement. The media file does not need to include a user prompt or inquiry for further action. Instead, the container may include software that, when executed, results in a device presentation of an indication that the advertisement creative is interactive, allowing a user to interact with a voice utterance, gesture, or other action to cause further device actions. In this manner, advertisers may not need to provide a media file that was generated to allow user interaction.

In one or more embodiments, to reduce the number and types of user interactions that a user would have to memorize to determine how to respond to a particular type of wrapped advertisement, one or more user responses to a wrapped advertisement may be allowed for any type of advertisement creative, and a device automatically may determine the actions to take in response to the user's interactive response without requiring the user to specify the action. For example, by prefacing an advertisement creative with a voice introduction: "This is an interactive advertisement," the voice introduction may indicate to a user that a particular word or gesture may indicate a user preference to perform additional actions in response to the advertisement creative. For example, a user may need only to utter a word or phrase (e.g., "Click," "Continue," "More," etc.) regardless of the type of advertisement creative and without the user needing to specify or be presented with the specific follow-up actions that the device is to perform in response to a user interaction. In some embodiments, when the keyword or phrase indicating a user preference to continue is prefaced by a wake word, the combination of the wake word and the keyword or phrase may be an indication to the device that the user prefers to be presented with additional data (e.g., based on one or more actions to perform based on the user's response to the interactive advertisement).

In one or more embodiments, the user interaction, user preferences, a type of data, and/or any previously presented content may be considered by a device when determining which data to present in response to a user interaction, and with which device to present the data. For example, a user interaction may specify the data to be presented and/or on which device to present the data (e.g., using a voice utterance, gesture, etc.). The type/format of data may be based on the user's available devices (e.g., whether the user's available devices have a display for images/video, speakers for audio, etc.). The device selected to present the data may be based on the type/format of the data (e.g., audio, video/images, text, e-mails, coupons, etc.), based on a user preference (e.g., learned by the device from previous interactions and/or previously set by the user), and/or based on any previous presentation of content (e.g., when the interactive advertisement interrupts presentation of other content on a device, the data may be presented on a different device to minimize the interruption of the other content being presented).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for using an interactive wrapper for media content, in accordance with one or more example embodiments of the present disclosure.

Referring to FIG. 1, the system 100 may include a person 102 who may be using one or more devices, such as a wearable device 104, a wearable device 106, a smart device 108, and may interact with one or more devices 110, such as device 112, device 114, and/or device 116. Any of the wearable device 104, the wearable device 106, the smart device 108, and/or the one or more devices 110 may present audio 118 and/or video (e.g., using the device 116 as a display) to the person 102. For example, the audio 118 or video may include optional presentation of content (e.g., an audiobook, music, etc.), followed by an indication of a presence of interactive content (e.g., a voice recording saying, "This is an interactive advertisement"), followed by presentation of an advertisement 120 (e.g., an audio file). The advertisement 120, if presented without the indication of a presence of interactive content (e.g., presented alone as an audio file) or presented without a separate call to action, may not be interactive. However, by adding the advertisement 120 (e.g., as a file) to a software container 122, the advertisement 120 may become interactive. In particular, the software container 122 may include a call to action 124 (e.g., an indication of a presence of interactive content and/or an invitation to the person 102 to interact with the advertisement 120) so that when the advertisement 120 is added to the software container 122, the execution of the software of the software container 122 may result in an interactive advertisement that indicates to the person 102 that the advertisement 120 is interactive, thereby indicating to the person 102 that the person 102 may respond to the advertisement 120, and that the person's response may result in presentation of data associated with an action 130. For example, the person 102 may hear the audio 118 and respond with a voice utterance 121 (e.g., "Click," "Select," "Continue," "Yes," or the like, any of which may be preceded with a wake word or phrase to indicate that the voice utterance 121 represents a command), a gesture, a touch (e.g., of any of the devices), or the like to indicate to any of the devices that the person 102 has requested or has not requested the action 130 to be performed in response to the audio 118 (e.g., in response to the advertisement 120).

Still referring to FIG. 1, at a later time (e.g., responsive to the user interaction, such as the voice utterance 121), any of the wearable device 104, the wearable device 106, the smart device 108, and/or the one or more devices 110 may present data associated with the action 130 to the person 102. The data associated with the action 130 may be presented as text, audio, and/or video using the same device that presented the advertisement 120 at the previous time, or using a different device than the device that presented the advertisement 120 at the previous time. In this manner, by adding a non-interactive advertisement such as the advertisement 120 to the software container 122, the non-interactive advertisement may become part of an interactive advertisement that, when responded to by the person 102, results in additional actions performed by any of the devices and the data associated with the action 130 being presented to the person 102. The person 102 may interact further with the data associated with the action 130 with additional user interactions (e.g., voice utterance 150, other gestures, selections, etc.). For example, the data associated with the action 130 may be the presentation of an application, media title, product page, virtual shopping cart, offers/coupons, a purchase page, an additional advertisement, or the like, and a subsequent interaction such as the voice utterance 150 may represent a user request to purchase or view the product or media presented by the data associated with the action 130, to execute an application represented by the data associated with the action 130, etc.

Figure 2:
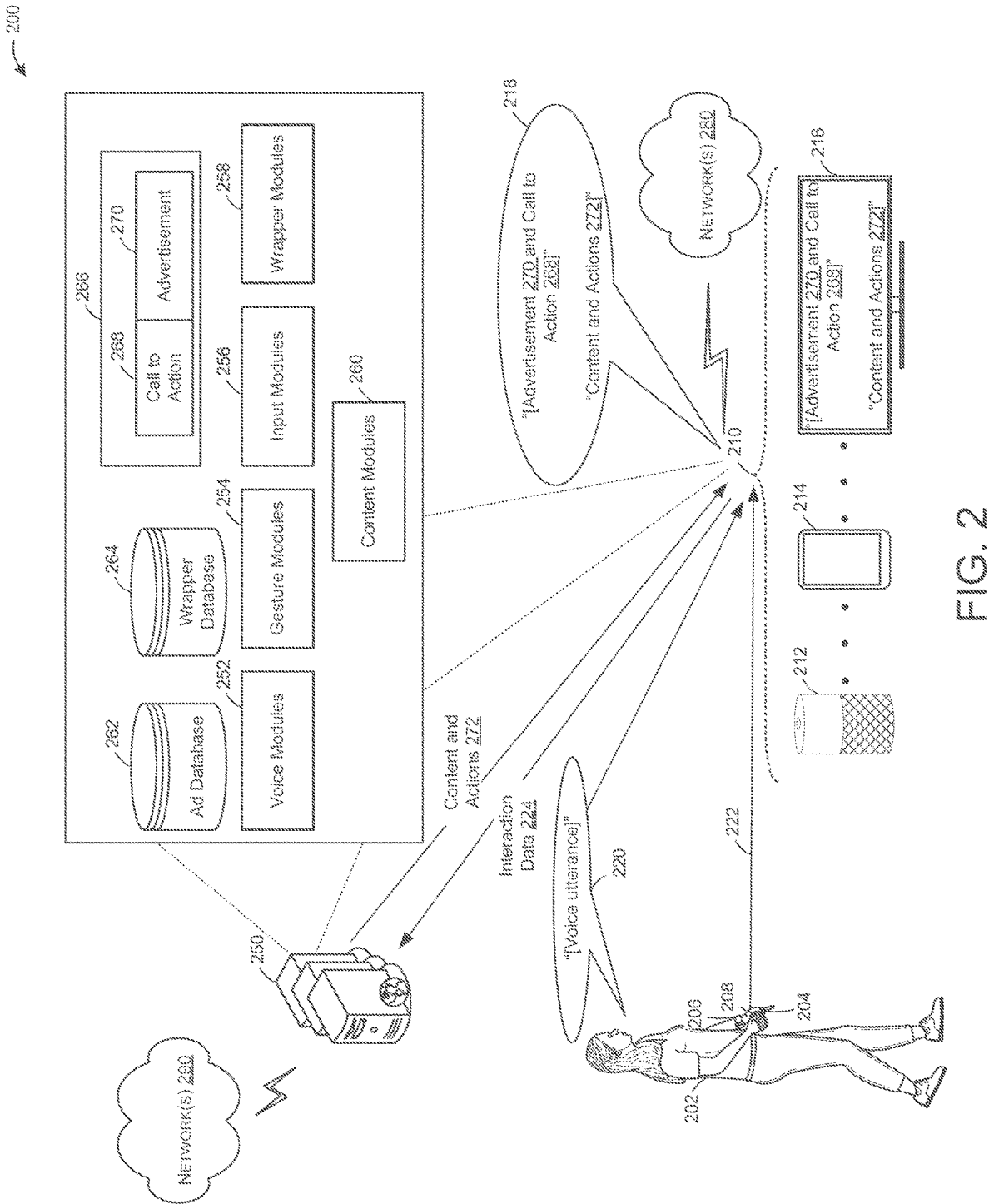
FIG. 2 illustrates an example system for using an interactive wrapper for media content, in accordance with one or more example embodiments of the present disclosure.

In one or more embodiments, advertisement or other content that does not include an indication that the content is interactive (e.g., an audio advertisement that does not mention that the advertisement allows for user interaction) may be used to generate an interactive advertisement creative without having to alter the content. To render a content of a non-interactive advertisement creative available for user interaction, any of the devices (or a remote device, such as a cloud-based system as shown in FIG. 2) may "wrap" the advertisement 120 using the software container 122 (e.g., software application, libraries, configuration files, etc.). In particular, with a pre-generated wrapper (e.g., the software container 122), an existing file (e.g., an audio file with the advertisement 120) may be added into the wrapper, resulting in a wrapped, interactive advertisement creative that uses and does not alter the advertisement 120. For example, the advertisement 120 may be wrapped with the software container 122, and the call to action 124 may precede and/or follow the advertisement 120, or may be presented during presentation of the advertisement 120 (e.g., a light, text, a sound, etc.). Because the software container 122 used to wrap the advertisement 120 may include audio or video to introduce the advertisement 120 as an advertisement and audio or video to enquire about a user's interest in the content of the a advertisement 120, the wrapper may allow for user interaction with the advertisement 120 without altering the content of the advertisement 120. An example may include a first portion of the wrapper including the call to action 124 as a voice introduction: "This is an advertisement," followed by presentation of the audio file, followed by a second portion of the wrapper with a voice inquiry: "Just say '[action]' to engage." When the user says the "action" word (e.g., "Yes," "Continue," or the like), a device may respond by performing one or more actions as described further herein. In this manner, an audio file (e.g., a .mp3 or .mp4 file), such as an audio file used in a radio advertisement, may be converted to an interactive advertisement using wrapping and without altering the content of the advertisement 120.

In one or more embodiments, a user interaction with a wrapped advertisement creative may include the voice utterance 121 responding to an inquiry or invitation to continue, learn more, purchase a product, or the like, as provided by the wrapper. Alternatively or in addition, a user's interaction may include a touch, click, gesture, or the like. For example, the wrapper may invite a user to click a link, button, screen, or another object, gesture to indicate whether or not to continue, or to remain silent for a time period.

In one or more embodiments, in response to a user interaction (or lack thereof) with a wrapped advertisement creative, any of the devices (or a remote cloud-based device as shown in FIG. 2) may determine one or more additional actions to be performed by the device and/or by one or more other devices. For example, content such as images, video, audio, links, messages, and the like may be presented using the device and/or by one or more other devices. For example, when the person 102 is listening to audio using the device 112 and the device 112 presents the audio 118 as a wrapped advertisement creative, and when the person 102 interacts in a way that indicates the person's interest in additional actions related to the advertisement 120, the device 112 may continue to present the audio to which the person 102 was listening while another device (e.g., the device 114, the device 116, etc.) may present the data associated with the action 130, which may include information about the content presented in the advertisement creative. In this manner, after the advertisement creative, the person's listening to the audio is no longer interrupted (at least for a time).

In one or more embodiments, the actions that a device may perform in response to a user interaction (or lack thereof) may include a variety of actions. The device or another device may purchase a product, add a product to a virtual shopping cart, present links, present messages, present additional media, add user subscriptions, apply cost savings/discounts, present games or other interactive content, execute applications, and the like in response to a user's interactive response to a wrapped advertisement creative. Which action to perform, which associated data of the action to present, and on which devices may be based on a specific user interaction (e.g., the person 102 may request a particular device with which to be presented more information from an advertisement creative) or may be determined by a device based on user preferences, data types and formats (e.g., video data may be presented on a device with a display), available devices, the type and/or format of data being presented to the user before the advertisement creative was presented (e.g., when the person 102 is listening to music or watching a video on one device, the follow-up action may include presentation on a different device to avoid further interruption of the music or video), and/or other criteria.

In one or more embodiments, the software container 122 may be pre-generated to allow for a media file (e.g., the advertisement 120) to be added to the software container 122. In this manner, the software container 122 may be presented with a single media file rather than requiring a sequence of media files to be presented. The process of rendering any advertisement actionable (e.g., user interactive) may be simplified by allowing for the inclusion of a media file in a container to generate a wrapped advertisement. The media file does not need to include a user prompt or inquiry for further action. Instead, the software container 122 may include software that, when executed, results in a device presentation of an indication that the advertisement creative is interactive (e.g., the call to action 124), allowing the person 102 to interact with the voice utterance 121, gesture, or other action to cause further device actions. In this manner, advertisers may not need to provide a media file that was generated to allow user interaction. In particular, the advertisement 120 may not include a call to action, or may include a different call to action than the call to action 124 that renders the advertisement 120 an interactive advertisement.

In one or more embodiments, to reduce the number and types of user interactions that the person 102 would have to memorize to determine how to respond to a particular type of wrapped advertisement, one or more user responses to a wrapped advertisement may be allowed for any type of advertisement creative, and a device automatically may determine the actions to take in response to the person's interactive response without requiring the person 102 to specify the action. For example, by prefacing the advertisement 120 with the call to action 124 a voice introduction: "This is an interactive advertisement," the voice introduction may indicate to the person 102 that a particular word or gesture may indicate a user preference to perform additional actions in response to the advertisement creative. For example, the person 102 may need only to utter a word or phrase (e.g., "Click," "Continue," "More," etc.) regardless of the type of advertisement creative and without the person 102 needing to specify or be presented with the specific follow-up actions that the device is to perform in response to a user interaction. In some embodiments, when the keyword or phrase indicating a user preference to continue is prefaced by a wake word, the combination of the wake word and the keyword or phrase may be an indication to the device that the person 102 prefers to be presented with the data associated with the action 130.

In one or more embodiments, the user interaction, user preferences, a type of data, and/or any previously presented content may be considered by any device when determining which actions to perform and their related data to present in response to a user interaction, and with which device to present the data. For example, a user interaction may specify the data to be presented and/or on which device to present the data (e.g., using a voice utterance, gesture, etc.). The type/format of data may be based on the user's available devices (e.g., whether the user's available devices have a display for images/video, speakers for audio, etc.). The device selected to present the data may be based on the type/format of the data (e.g., audio, video/images, etc.), based on a user preference (e.g., learned by the device from previous interactions and/or previously set by the user), and/or based on any previous presentation of data (e.g., when the interactive advertisement interrupts presentation of other data on a device, the data may be presented on a different device to minimize the interruption of the other data being presented).

In one or more embodiments, the wearable device 104, the wearable device 106, the smart device 108, and/or the one or more devices 110 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

FIG. 2 illustrates an example system 200 of using an interactive wrapper for media content, in accordance with one or more example embodiments of the present disclosure.

Referring to FIG. 2, the system 200 may include a user 202 (e.g., the person 102 of FIG. 2) who may be using one or more devices (e.g., similar to the respective devices of FIG. 1), such as a wearable device 204, a wearable device 206, a smart device 208, and may interact with one or more devices 210, such as device 212, device 214, and/or device 216. Any of the wearable device 204, the wearable device 206, the smart device 208, and/or the one or more devices 210 may present audio content 218 and/or video (e.g., using the device 216 as a display) to the user 202. For example, the audio content 218 may include the music, audiobooks, games, and the like, and interactive content such as the interactive advertisement 120 of FIG. 1 (e.g., using a software container as described further herein). The user 202 may interact with any of the devices, such as by speaking (e.g., voice utterance 220), gesturing, touching, clicking, or otherwise interacting with any of the devices shown. The voice utterance 220 and/or any other user interactions may be provided to/detected as user inputs 222 by any of the devices shown. Any of the devices shown may send interaction data 224 indicative of the user inputs 222 and/or the voice utterance 220 to a remote system 250 (e.g., a cloud-based system), which may analyze the interaction data 224 to determine actions and associated action data to provide to any of the devices shown for presentation to the user 202.

Still referring to FIG. 2, the remote system 250 or any of the devices 210 (or any of the devices shown) may include voice modules 252 for translating the voice utterance 220 into commands (e.g., using natural language processing or other techniques), gesture modules 254 for translating any gestures indicated by the interaction data 224 into commands (e.g., by using image analysis techniques to identify movements that match known gestures), input modules 256 for translating other types of inputs indicated by the interaction data 224 into commands, wrapper modules 258 for generating interactive content, content modules 260 for determining which content to present to the user 202, in which formats, and using which devices. For example, the wrapper modules 258 may generate an interactive advertisement by using a pre-generated software container 266, including a call to action 268 (e.g., indicating that the content being presented is interactive and/or indicating optional user responses and/or additional data to be presented, questions for the user to answer with user interactions, and the like), and adding to the software container 266 an advertisement 270 (e.g., an advertisement that is not itself interactive, such as a media file with advertising content and without a call to action). The remote system 250 may send content and action data 272 to any of the devices shown for presentation, including the wrapped advertisement 270 as interactive content, and any action data in response to a user interaction with the interactive content (e.g., when the voice utterance 220 or user inputs 222 indicate a user interaction with the interactive content). The advertisement 270 and other advertisement creatives may be stored in an advertisement database 262 or other data storage, and the software container 266 may be stored in a wrapper database 264 or other data storage. For example, the audio content 218 and/or video (e.g., using the device 216 as a display) presented may include the advertisement 270 and the call to action 268 (in any order), and data associated with the content and action data 272 responsive to a user interaction with the advertisement 270. The call to action 268 may not itself be an advertisement, but when added to the advertisement 270 via the software container 266, may render the advertisement 270 interactive.

In one or more embodiments, advertisement or other content that does not include an indication that the content is interactive (e.g., an audio advertisement that does not mention that the advertisement allows for user interaction) may be used to generate an interactive advertisement creative without having to alter the content. To render a content of a non-interactive advertisement creative available for user interaction, the wrapper modules 258 may "wrap" the advertisement 270 using the software container 266 (e.g., software application, libraries, configuration files, etc.). In particular, with a pre-generated wrapper (e.g., the software container 266), an existing file (e.g., an audio or video file with the advertisement 270) may be added into the wrapper, resulting in a wrapped, interactive advertisement creative that uses and does not alter the advertisement 270. For example, the advertisement 270 may be wrapped with the software container 266, and the call to action 268 may precede and/or follow the advertisement 270. Because the software container 266 used to wrap the advertisement 270 may include audio or video to introduce the advertisement 270 as an advertisement and audio or video to enquire about a user's interest in the content of the advertisement 270, the wrapper may allow for user interaction with the advertisement 270 without altering the content of the advertisement 270. An example may include a first portion of the wrapper including the call to action 268 as a voice introduction: "This is an advertisement," followed by presentation of the advertisement 270 (e.g., a media file), followed by a second portion of the wrapper with a voice inquiry: "Just say '[action]' to engage." When the user says the "action" word (e.g., "Yes," "Continue," or the like), a device may respond by performing one or more actions as described further herein. In this manner, an audio file (e.g., a .mp3 or .mp4 file), such as an audio file used in a radio advertisement, may be converted to an interactive advertisement using wrapping and without altering the content of the advertisement 120.

In one or more embodiments, a user interaction with a wrapped advertisement creative may include the voice utterance 220 responding to an inquiry or invitation to continue (e.g., the call to action 268), learn more, purchase a product, or the like, as provided by the wrapper. Alternatively or in addition, the user's interaction, indicated by the user inputs 222, may include a touch, click, gesture, or the like. For example, the audio content 218 or other presentation of the wrapped advertisement 270 (e.g., using a display of the device 216) may invite the user 202 to click a link, button, screen, or another object, gesture to indicate whether or not to continue, or to remain silent for a time period.

In one or more embodiments, in response to a user interaction (or lack thereof) with a wrapped advertisement creative, the content modules 260 may determine one or more additional actions to be performed by any of the devices shown. For example, data such as images, video, audio, links, messages, and the like may be presented using the device that presented the wrapped advertisement, and/or by one or more other devices. For example, when the user 202 is listening to audio using the device 212 and the device 212 presents the audio 218 as a wrapped advertisement creative, and when the user 202 interacts in a way that indicates the person's interest in learning more, the device 212 may continue to present the audio to which the user 202 was listening while another device (e.g., the device 214, the device 216, etc.) may present additional information about the content presented in the advertisement creative. In this manner, after the advertisement creative, the person's listening to the audio is no longer interrupted (at least for a time).

In one or more embodiments, the actions that a device may perform in response to a user interaction (or lack thereof) may include a variety of actions. The device or another device may purchase a product, add a product to a virtual shopping cart, present links, present messages, present additional media, add user subscriptions, apply cost savings/discounts, present games or other interactive content, execute applications, and the like in response to a user's interactive response to a wrapped advertisement creative. Which action to perform, which related data to present, and on which devices may be based on a specific user interaction (e.g., the user 202 may request a particular device with which to be presented more information from an advertisement creative) or may be determined by a device based on user preferences, data types and formats (e.g., video data may be presented on a device with a display), available devices, the type and/or format of data being presented to the user before the advertisement creative was presented (e.g., when the user 202 is listening to music or watching a video on one device, the follow-up action may include presentation on a different device to avoid further interruption of the music or video), and/or other criteria. The content modules 260 may determine the type of data and/or which device with which to present the content (e.g., the content and action data 272).

In one or more embodiments, the software container 266 may be pre-generated to allow for a media file (e.g., the advertisement 270) to be added to the software container 266. In this manner, the software container 266 may be presented with a single media file rather than requiring a sequence of media files to be presented. The process of rendering any advertisement actionable (e.g., user interactive) may be simplified by allowing for the inclusion of a media file in a container to generate a wrapped advertisement. The media file does not need to include a user prompt or inquiry for further action. Instead, the software container 266 may include software that, when executed, results in a device presentation of an indication that the advertisement creative is interactive, allowing the user 202 to interact with the voice utterance 220, gesture, or other action to cause further device actions. In this manner, advertisers may not need to provide a media file that was generated to allow user interaction. The advertisement 270 may or may not include a call to action, but the call to action 268 may be separate from the advertisement 270 to make the advertisement 270 interactive without actually modifying any content or code of the advertisement 270.

In one or more embodiments, to reduce the number and types of user interactions that the user 202 would have to memorize to determine how to respond to a particular type of wrapped advertisement, one or more user responses to a wrapped advertisement may be allowed for any type of advertisement creative, and the voice modules 252, the gesture modules 254, and/or the input modules 256 automatically may determine the actions to take in response to the person's interactive response without requiring the user 202 to specify the action. For example, by prefacing the advertisement 270 with the call to action 268 as a voice introduction: "This is an interactive advertisement," "Would you like to learn more," "Would you like to purchase," "Would you like to add content to your queue," and the like, the voice introduction may indicate to the user 202 (e.g., when the wrapped advertisement is presented as the audio content 218 or otherwise using any of the devices shown) that a particular word or gesture may indicate a user preference to perform additional actions in response to the advertisement creative. For example, the user 202 may need only to utter a word or phrase (e.g., "Yes," "Click," "Continue," "More," etc.) regardless of the type of advertisement creative and without the user 202 needing to specify or be presented with the specific follow-up actions that the device is to perform in response to a user interaction. In some embodiments, when the keyword or phrase indicating a user preference to continue is prefaced by a wake word, the combination of the wake word and the keyword or phrase may be an indication to the device that the user 202 prefers to be presented with the content and action data 272 (e.g., data additional to the advertisement 270 and related to an action to be performed responsive to a user interaction with the advertisement 270).

In one or more embodiments, the user interaction, user preferences, a type of data, and/or any previously presented data may be considered by the content modules 260 when determining which data to present in response to a user interaction, and with which device to present the data. For example, a user interaction may specify the data to be presented and/or on which device to present the data (e.g., using a voice utterance, gesture, etc.). The type/format of data may be based on the user's available devices (e.g., whether the user's available devices have a display for images/video, speakers for audio, etc.). The device selected to present the data may be based on the type/format of the data (e.g., audio, video/images, etc.), based on a user preference (e.g., learned by the device from previous interactions and/or previously set by the user), and/or based on any previous presentation of data (e.g., when the interactive advertisement interrupts presentation of other data on a device, the data may be presented on a different device to minimize the interruption of the other data being presented).

In one or more embodiments, the content and action data 272 may include tracking information to allow for attribution. When the user 202 interacts with the advertisement 270, it may be beneficial to attribute the interaction to the advertisement 270 and/or to the software container 266. The content and action data 272 may include a pixel or other marker to that, when the user 202 interacts with the advertisement 270, provides an indication of the interaction with the advertisement 270 to allow for attribution of the interaction. In this manner, no matter which device presents the content and action data 272 responsive to the user interaction with the advertisement 270, and no matter which device detects the user interaction, the interaction may be attributed to the advertisement 270 and/or the software container 266.

In one or more embodiments, the wearable device 204, the wearable device 206, the smart device 208, and/or the one or more devices 210 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the one or more devices 210 and/or the remote system 250 may be configured to communicate with each other via one or more communications networks 280 and/or 290 wirelessly or wired. Any of the communications networks 280 and/or 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 280 and/or 290 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 280 and/or 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3:
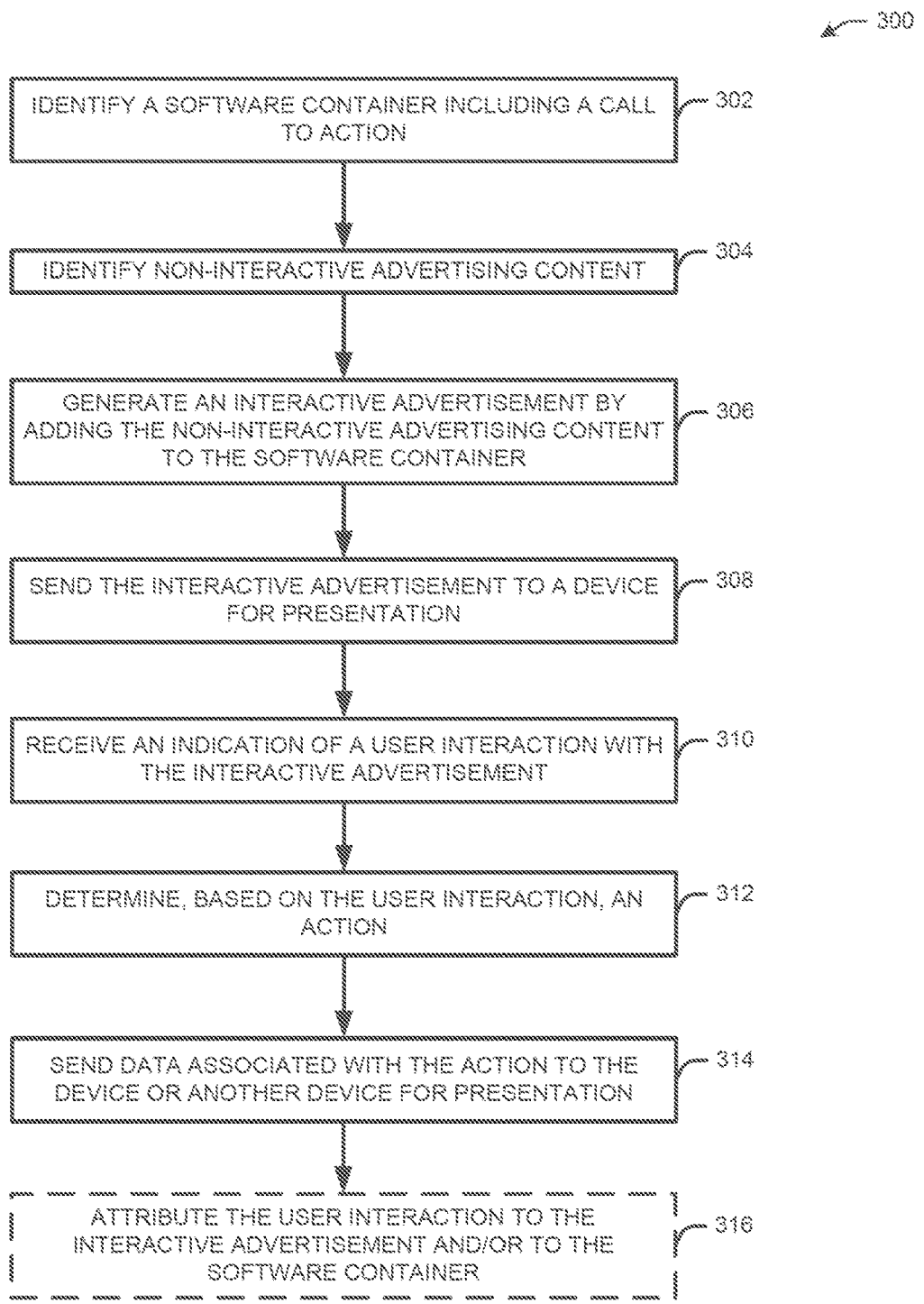
FIG. 3 illustrates a flow diagram for a process for using an interactive wrapper for media content, in accordance with one or more example embodiments of the present disclosure.

FIG. 3 illustrates a flow diagram for a process 300 for using an interactive wrapper for media content, in accordance with one or more example embodiments of the present disclosure.

At block 302, a device (e.g., the wearable device 104 of FIG. 1, the wearable device 106 of FIG. 1, the smart device 108 of FIG. 1, the one or more devices 110 of FIG. 1, the wearable device 204 of FIG. 2, the wearable device 206 of FIG. 2, the smart device 208 of FIG. 2, the one or more devices 210 of FIG. 2, the remote system 250 of FIG. 2) may identify a software container (e.g., the software container 122 of FIG. 1, the software container 266 of FIG. 2) that may include an interactive a call to action (e.g., the call to action 124 of FIG. 1, the call to action 268 of FIG. 2). The software container may be one of multiple software containers that have been pre-generated, or the device may generate the software container. The software container may include software application code, libraries, configuration files, and the like, that, when executed, result in presentation of content (e.g., the call to action). The interactive call to action may vary. For example, the first time that the interactive call to action is presented as part of a wrapped advertisement, the interactive call to action may include audio, video, and/or text to explain that a person may respond to the interactive call to action using a voice response, a gesture, a click or touch, or the like. In this manner, the interactive call to action may inform a user that an advertisement is interactive, and the ways that the user may interact with the advertisement. A second time that an interactive wrapped advertisement is presented, the call to action may be different, such as a sound (e.g., a beep or a tone, etc.), a presented light (e.g., the light indicative of the advertisement being interactive), or a shorter audio, video, and/or text indicator (e.g., "Would you like to hear more," Are you interested," etc.). The way that a call to action may be presented may be based on user preferences and/or user interaction history (e.g., whether the user responded to one type of call to action versus another type of call to action, etc.). In this manner, a non-interactive advertisement may be wrapped with a container including a call to action or another indicator that the advertisement is interactive, allowing a user to identify and interact with the advertisement.

At block 304, the device may identify non-interactive content (e.g., advertising content such as the advertisement 120 of FIG. 1 or the advertisement 270 of FIG. 2). The non-interactive content may include one or more media files (e.g., audio, images, video, etc.) provided by an advertiser or another party. For example, the non-interactive content may include an advertisement, such as an audio advertisement (e.g., a radio advertisement) or a video advertisement (e.g., a web-based video advertisement) that is playable as an executable media file, but that is non-interactive in that the content provides no indication that the advertisement is interactive (e.g., lacks a call to action), and does not allow for a user to communicate a request for data (e.g., using a voice utterance, gesture, touch, click, etc.) such as more details about a product or service advertised by the advertisement, a subscription, a cost savings offer, a product page, a purchase/transaction process, or the like. Alternatively, the advertisement may include a non-interactive call to action that is different than the interactive call to action of the software container of block 302 (e.g., a website or phone number where a product may be purchased). However, the advertisement may be non-interactive in that a person cannot interact with the advertisement, and instead may need to separately visit a website, call a phone number, etc.

At block 306, the device may generate an interactive advertisement by adding the non-interactive content to the software container. The device may add the media file with non-interactive advertisement material to the software container, and because of the interactive call to action in the software container, when the software container is executed and the advertisement content is presented, the interactive call to action may indicate to a user that the user may respond to the presentation of the advertisement with a voice utterance, gesture, touch, click, etc. to request data to be presented. In this manner, the non-interactive content may be used as part of interactive content by adding the non-interactive content to the software container without modifying the non-interactive content (e.g., without modifying the executable file that includes the advertisement). A device that presents the advertisement with the interactive call to action may identify user responses to the advertisement, resulting in the advertisement becoming interactive as a response to a user interaction is determined and results in the performance of actions, such as the display of data associated with the actions. For example, when the actions include displaying a product page, purchase, page, or a virtual shopping cart, the data may include product data, such as an identifier of the product (e.g., a product code), a price of the product, delivery/pick-up information, and the like. When the actions include displaying another advertisement, the data may include an additional advertisement creative (e.g., possibly wrapped in another interactive file wrapper). When the actions include adding content to a queue (e.g., a watch list, a playlist, a reading list, etc.), the data may include information regarding the content that is in the queue. When the actions include an offer/coupon, the data may include offer/coupon data indicative of a product price, offer/coupon terms, and the like.

At block 308, the device may present the interactive content or send the interactive content to another device for presentation. The device selected for presentation may be based on whether the device already is presenting data (e.g., when the device is streaming media, the interactive content may be presented as an advertisement during the stream), or based on the type/format of data and which device is able to present data of the type/format (e.g., a display device for images/video data, an audio device for audio data, etc.).

At block 310, the device may receive an indication of a user interaction with the interactive content. For example the voice utterance 121 of FIG. 1, the voice utterance 220 of FIG. 2, and/or the user inputs 222 of FIG. 2 may be detected by or provided to the device (e.g., the interaction data 224 of FIG. 2). The user interaction may include any combination of voice utterances, gestures, touches, clicks, or other selections indicating a user request for an action to be performed in response to the user interaction with the interactive advertisement.

At block 312, the device may determine, based on the user interaction, an action to perform and related data of the action to present. In one or more embodiments, the user interaction, user preferences, a type of data, and/or any previously presented data may be considered by a device when determining which data to present in response to a user interaction, and with which device to present the data. For example, a user interaction may specify the data to be presented and/or on which device to present the data (e.g., using a voice utterance, gesture, etc.). The type/format of data may be based on the user's available devices (e.g., whether the user's available devices have a display for images/video, speakers for audio, etc.). The device selected to present the data may be based on the type/format of the additional data (e.g., audio, video/images, etc.), based on a user preference (e.g., learned by the device from previous interactions and/or previously set by the user), and/or based on any previous presentation of data (e.g., when the interactive advertisement interrupts presentation of other data on a device, the data may be presented on a different device to minimize the interruption of the other data being presented). There may be multiple different types of data to be presented using one or multiple devices (e.g., a video on one device, audio on another device, a message or link on another device, etc.).

At block 314, the device may present the data or send the data to another device (or to multiple devices) for presentation. The data may include a product page, a transaction page, a virtual shopping cart, an application or other program, a game, an offer, a message, and/or follow-up questions to the user regarding the user's preference of a product, the device with which to present data, whether the user prefers the presentation of data now or later (e.g., whether the user would like to have a product or media title placed in a virtual shopping cart or watch list/playlist, whether the user would prefer to be sent a link for later use, or the like).

At block 316, optionally, the device may attribute the user interaction to the advertisement and/or to the software container. In one or more embodiments, the data associated with the action may include tracking information to allow for attribution. When the user interacts with the advertisement, it may be beneficial to attribute the interaction to the advertisement and/or to the software container. The data associated with the action may include a pixel or other marker to that, when the user interacts with the advertisement, provides an indication of the interaction with the advertisement to allow for attribution of the interaction. In this manner, no matter which device presents the data associated with the action responsive to the user interaction with the advertisement, and no matter which device detects the user interaction, the interaction may be attributed to the advertisement and/or the software container. In this manner, a user interaction or lack thereof may be used by the device to update user preferences.

Figure 4:
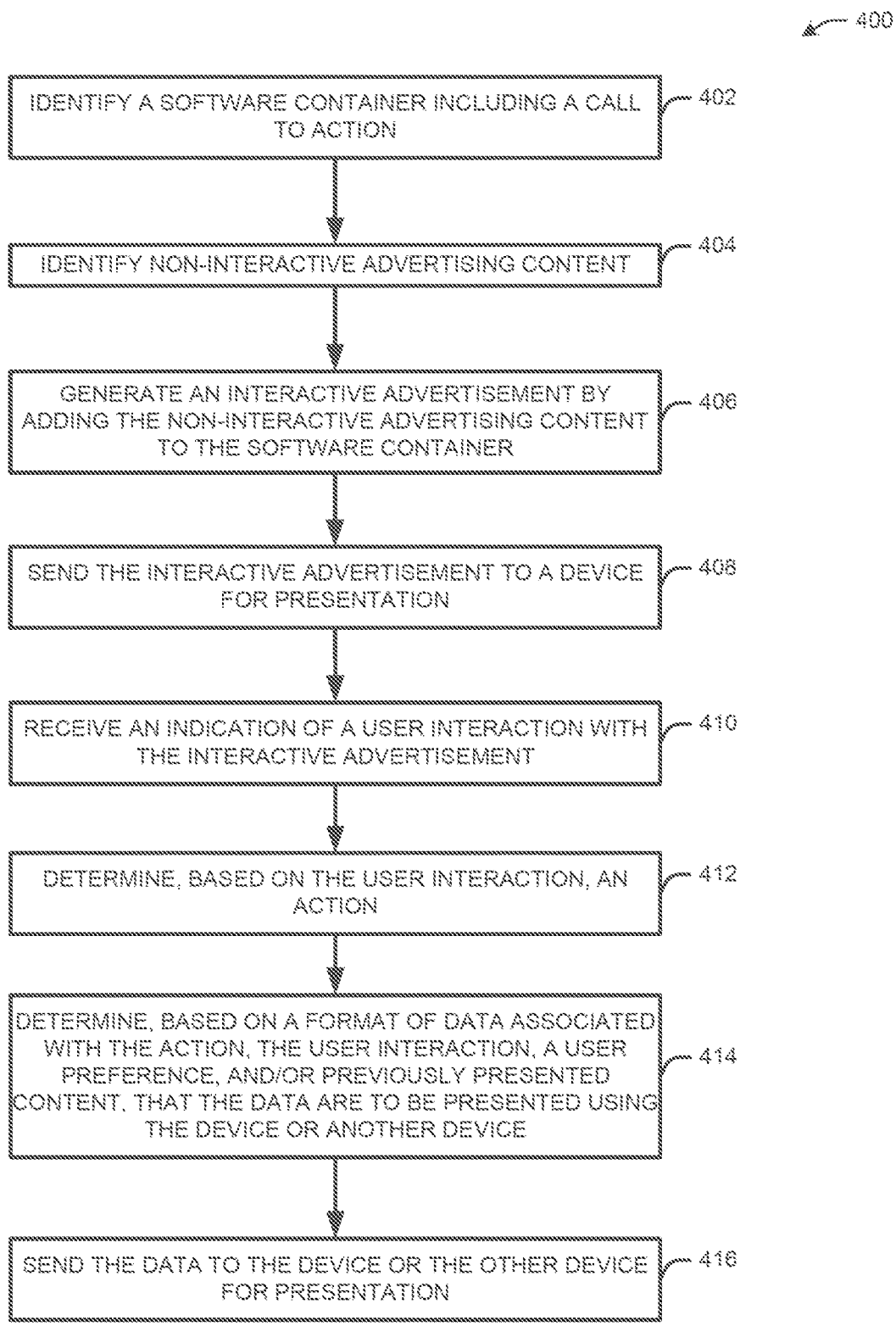
FIG. 4 illustrates a flow diagram for a process for using an interactive wrapper for media content, in accordance with one or more example embodiments of the present disclosure.

FIG. 4 illustrates a flow diagram for a process 400 for using an interactive wrapper for media content, in accordance with one or more example embodiments of the present disclosure.

At block 402, a device (e.g., the wearable device 104 of FIG. 1, the wearable device 106 of FIG. 1, the smart device 108 of FIG. 1, the one or more devices 110 of FIG. 1, the wearable device 204 of FIG. 2, the wearable device 206 of FIG. 2, the smart device 208 of FIG. 2, the one or more devices 210 of FIG. 2, the remote system 250 of FIG. 2) may identify a software container (e.g., the software container 122 of FIG. 1, the software container 266 of FIG. 2) that may include an interactive call to action indicative of a presence of interactive content (e.g., the call to action 124 of FIG. 1, the call to action 268 of FIG. 2). The software container may be one of multiple software containers that have been pre-generated, or the device may generate the software container. The software container may include software application code, libraries, configuration files, and the like, that, when executed, result in presentation of content. The interactive call to action may vary. For example, the first time that the interactive call to action is presented as part of a wrapped advertisement, the interactive call to action may include audio, video, and/or text to explain that a person may respond to the interactive call to action using a voice response, a gesture, a click or touch, or the like. In this manner, the interactive call to action may inform a user that an advertisement is interactive, and the ways that the user may interact with the advertisement. A second time that an interactive wrapped advertisement is presented, the call to action may be different, such as a sound (e.g., a beep or a tone, etc.), a presented light (e.g., the light indicative of the advertisement being interactive), or a shorter audio, video, and/or text indicator (e.g., "Would you like to hear more," Are you interested," etc.). The way that a call to action may be presented may be based on user preferences and/or user interaction history (e.g., whether the user responded to one type of call to action versus another type of call to action, etc.). In this manner, a non-interactive advertisement may be wrapped with a container including a call to action or another indicator that the advertisement is interactive, allowing a user to identify and interact with the advertisement.

At block 404, the device may identify non-interactive content (e.g., advertising content such as the advertisement 120 of FIG. 1 or the advertisement 270 of FIG. 2). The non-interactive content may include one or more media files (e.g., audio, images, video, etc.) provided by an advertiser or another party. For example, the non-interactive content may include an advertisement, such as an audio advertisement (e.g., a radio advertisement) or a video advertisement (e.g., a web-based video advertisement) that is playable as an executable media file, but that is non-interactive in that the content provides no indication that the advertisement is interactive, and does not allow for a user to communicate a request for data (e.g., using a voice utterance, gesture, touch, click, etc.) such as more details about a product or service advertised by the advertisement, a subscription, a cost savings offer, a product page, a purchase/transaction process, or the like. The advertisement may include or lack a non-interactive call to action that is different than the interactive call to action of the software container of block 302 (e.g., a website or phone number where a product may be purchased). However, the advertisement may be non-interactive in that a person cannot interact with the advertisement, and instead may need to separately visit a website, call a phone number, etc.

At block 406, the device may generate an interactive advertisement by adding the non-interactive content to the software container. The device may add the media file with non-interactive advertisement material to the software container, and because of the interactive call to action in the software container, when the software container is executed and the advertisement content is presented, the interactive call to action may indicate to a user that the user may respond to the presentation of the advertisement with a voice utterance, gesture, touch, click, etc. to request data to be presented. In this manner, the non-interactive content may be used as part of interactive content by adding the non-interactive content to the software container without modifying the non-interactive content. A device that presents the advertisement with the interactive call to action may identify user responses to the advertisement, resulting in the advertisement becoming interactive as a response to a user interaction is determined and results in the performance of actions, such as the display of data associated with the actions. For example, when the actions include displaying a product page, purchase, page, or a virtual shopping cart, the data may include product data, such as an identifier of the product (e.g., a product code), a price of the product, delivery/pick-up information, and the like. When the actions include displaying another advertisement, the data may include an additional advertisement creative (e.g., possibly wrapped in another interactive file wrapper). When the actions include adding content to a queue (e.g., a watch list, a playlist, a reading list, etc.), the data may include information regarding the content that is in the queue. When the actions include an offer/coupon, the data may include offer/coupon data indicative of a product price, offer/coupon terms, and the like.

At block 408, the device may present the interactive content or send the interactive content to another device for presentation. The device selected for presentation may be based on whether the device already is presenting data (e.g., when the device is streaming media, the interactive content may be presented as an advertisement during the stream), or based on the type/format of data and which device is able to present content of the type/format (e.g., a display device for images/video data, an audio device for audio data, etc.).

At block 410, the device may receive an indication of a user interaction with the interactive content. For example the voice utterance 121 of FIG. 1, the voice utterance 220 of FIG. 2, and/or the user inputs 222 of FIG. 2 may be detected by or provided to the device (e.g., the interaction data 224 of FIG. 2). The user interaction may include any combination of voice utterances, gestures, touches, clicks, or other selections indicating a user request for an action to be performed in response to the user interaction with the interactive advertisement.

At block 412, the device may determine, based on the user interaction, data associated with the action to present. In one or more embodiments, the user interaction, user preferences, a type of data, and/or any previously presented data may be considered by a device when determining which data to present in response to a user interaction, and with which device to present the data. For example, a user interaction may specify the data to be presented and/or with which device to present the data (e.g., using a voice utterance, gesture, etc.). The type/format of additional data may be based on the user's available devices (e.g., whether the user's available devices have a display for images/video, speakers for audio, etc.).

At block 414, the device may determine, based on any combination of the type/format of the data, the user interaction, a user preference, and/or previously presented data, the device with which to present the data. The device selected to present the data may be based on the type/format of the data (e.g., audio, video/images, etc.), based on a user preference (e.g., learned by the device from previous interactions and/or previously set by the user), and/or based on any previous presentation of data (e.g., when the interactive advertisement interrupts presentation of other data on a device, the data may be presented on a different device to minimize the interruption of the other content being presented).

At block 416, the device may present the data or send the data to another device for presentation. The data may include a product page, a transaction page, a virtual shopping cart, an application or other program, a game, an offer, a message, and/or follow-up questions to the user regarding the user's preference of a product, the device with which to present data, whether the user prefers the presentation of data now or later (e.g., whether the user would like to have a product or media title placed in a virtual shopping cart or watch list/playlist, whether the user would prefer to be sent a link for later use, or the like).

Figure 5:
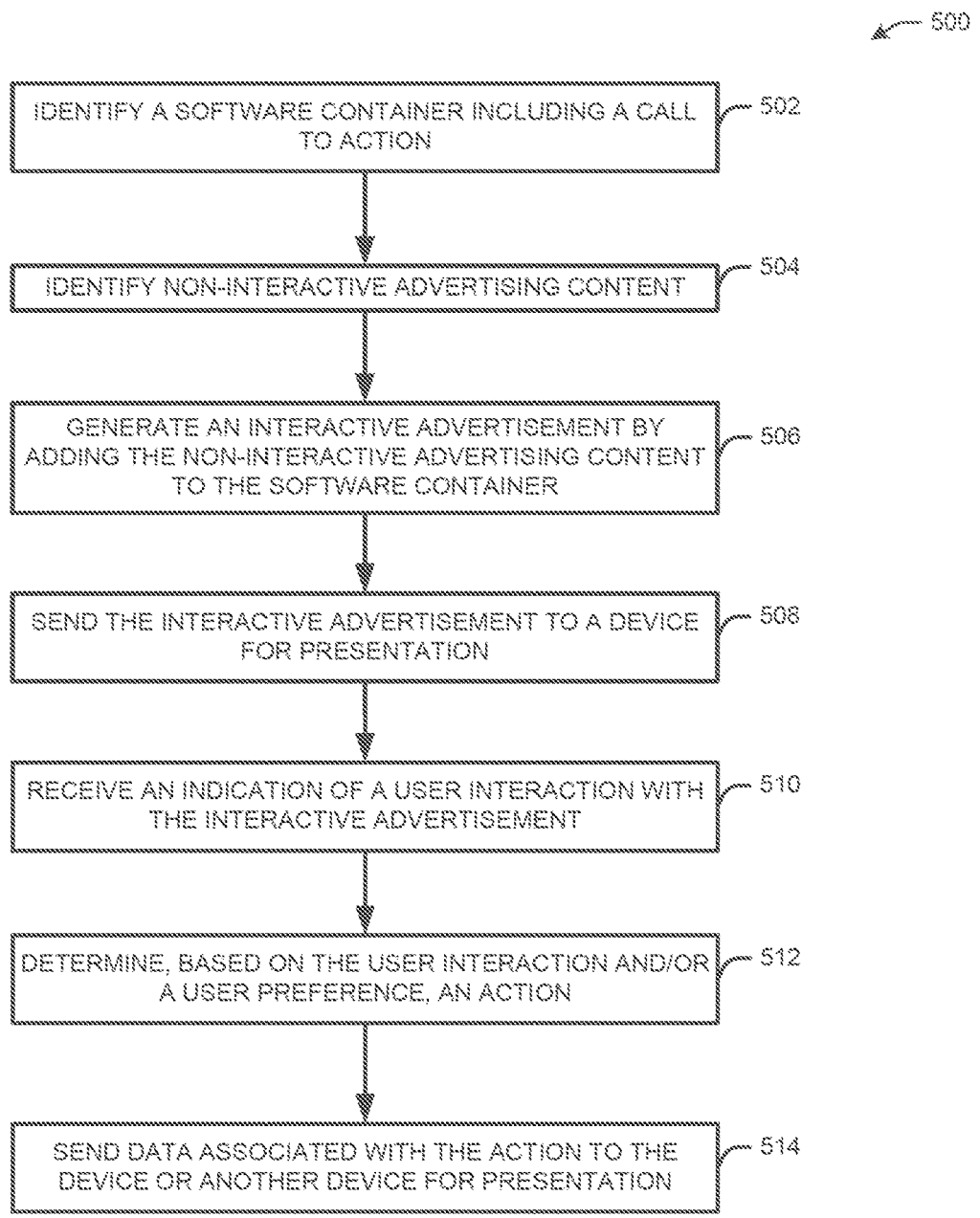
FIG. 5 illustrates a flow diagram for a process for using an interactive wrapper for media content, in accordance with one or more example embodiments of the present disclosure.

FIG. 5 illustrates a flow diagram for a process 500 for using an interactive wrapper for media content, in accordance with one or more example embodiments of the present disclosure.

At block 502, a device (e.g., the wearable device 104 of FIG. 1, the wearable device 106 of FIG. 1, the smart device 108 of FIG. 1, the one or more devices 110 of FIG. 1, the wearable device 204 of FIG. 2, the wearable device 206 of FIG. 2, the smart device 208 of FIG. 2, the one or more devices 210 of FIG. 2, the remote system 250 of FIG. 2) may identify a software container (e.g., the software container 122 of FIG. 1, the software container 266 of FIG. 2) that may include an interactive call to action indicative of a presence of interactive content (e.g., the call to action 124 of FIG. 1, the call to action 268 of FIG. 2). The software container may be one of multiple software containers that have been pre-generated, or the device may generate the software container. The software container may include software application code, libraries, configuration files, and the like, that, when executed, result in presentation of content (e.g., call to action). The interactive call to action may vary. For example, the first time that the interactive call to action is presented as part of a wrapped advertisement, the interactive call to action may include audio, video, and/or text to explain that a person may respond to the interactive call to action using a voice response, a gesture, a click or touch, or the like. In this manner, the interactive call to action may inform a user that an advertisement is interactive, and the ways that the user may interact with the advertisement. A second time that an interactive wrapped advertisement is presented, the call to action may be different, such as a sound (e.g., a beep or a tone, etc.), a presented light (e.g., the light indicative of the advertisement being interactive), or a shorter audio, video, and/or text indicator (e.g., "Would you like to hear more," Are you interested," etc.). The way that a call to action may be presented may be based on user preferences and/or user interaction history (e.g., whether the user responded to one type of call to action versus another type of call to action, etc.). In this manner, a non-interactive advertisement may be wrapped with a container including a call to action or another indicator that the advertisement is interactive, allowing a user to identify and interact with the advertisement.

At block 504, the device may identify non-interactive content (e.g., advertising content such as the advertisement 120 of FIG. 1 or the advertisement 270 of FIG. 2). The non-interactive content may include one or more media files (e.g., audio, images, video, etc.) provided by an advertiser or another party. For example, the non-interactive content may include an advertisement, such as an audio advertisement (e.g., a radio advertisement) or a video advertisement (e.g., a web-based video advertisement) that is playable as an executable media file, but that is non-interactive in that the content provides no indication that the advertisement is interactive, and does not allow for a user to communicate a request for data (e.g., using a voice utterance, gesture, touch, click, etc.) such as more details about a product or service advertised by the advertisement, a subscription, a cost savings offer, a product page, a purchase/transaction process, or the like. The advertisement may include or lack a non-interactive call to action that is different than the interactive call to action of the software container of block 302 (e.g., a website or phone number where a product may be purchased). However, the advertisement may be non-interactive in that a person cannot interact with the advertisement, and instead may need to separately visit a website, call a phone number, etc.

At block 506, the device may generate an interactive advertisement by adding the non-interactive content to the software container. The device may add the media file with non-interactive advertisement material to the software container, and because of the call to action in the software container, when the software container is executed and the advertisement content is presented, the call to action may indicate to a user that the user may respond to the presentation of the advertisement with a voice utterance, gesture, touch, click, etc. to request an action to be performed and related content (e.g., to the action) to be presented. In this manner, the non-interactive content may be used as part of interactive content by adding the non-interactive content to the software container without modifying the non-interactive content. A device that presents the advertisement with the call to action may identify user responses to the advertisement, resulting in the advertisement becoming interactive as a response to a user interaction is determined and results in the performance of actions, such as the display of data associated with the actions. For example, when the actions include displaying a product page, purchase, page, or a virtual shopping cart, the data may include product data, such as an identifier of the product (e.g., a product code), a price of the product, delivery/pick-up information, and the like. When the actions include displaying another advertisement, the data may include an additional advertisement creative (e.g., possibly wrapped in another interactive file wrapper). When the actions include adding content to a queue (e.g., a watch list, a playlist, a reading list, etc.), the data may include information regarding the content that is in the queue. When the actions include an offer/coupon, the data may include offer/coupon data indicative of a product price, offer/coupon terms, and the like.

At block 508, the device may present the interactive content or send the interactive content to another device for presentation. The device selected for presentation may be based on whether the device already is presenting data (e.g., when the device is streaming media, the interactive content may be presented as an advertisement during the stream), or based on the type/format of data and which device is able to present content of the type/format (e.g., a display device for images/video data, an audio device for audio data, etc.).

At block 510, the device may receive an indication of a user interaction with the interactive content. For example the voice utterance 121 of FIG. 1, the voice utterance 220 of FIG. 2, and/or the user inputs 222 of FIG. 2 may be detected by or provided to the device (e.g., the interaction data 224 of FIG. 2). The user interaction may include any combination of voice utterances, gestures, touches, clicks, or other selections indicating a user request for an action to be performed in response to the user interaction with interactive advertisement.

At block 512, the device may determine, based on the user interaction and/or a user preference (e.g., for content types/formats, products, etc.), action data to present. In one or more embodiments, the user interaction, user preferences, a type of data, and/or any previously presented data may be considered by a device when determining which action to perform and related data to present in response to a user interaction, and with which device to present the data. For example, a user interaction may specify the data to be presented and/or on which device to present the data (e.g., using a voice utterance, gesture, etc.). The type/format of data may be based on the user's available devices (e.g., whether the user's available devices have a display for images/video, speakers for audio, etc.). The device selected to present the data may be based on the type/format of the data (e.g., audio, video/images, etc.), based on a user preference (e.g., learned by the device from previous interactions and/or previously set by the user), and/or based on any previous presentation of data (e.g., when the interactive advertisement interrupts presentation of other data on a device, the data may be presented on a different device to minimize the interruption of the other data being presented).

At block 514, the device may present the data or send the data to another device for presentation. The data may include a product page, a transaction page, a virtual shopping cart, an application or other program, a game, an offer, a message, and/or follow-up questions to the user regarding the user's preference of a product, the device with which to present data, whether the user prefers the presentation of data now or later (e.g., whether the user would like to have a product or media title placed in a virtual shopping cart or watch list, whether the user would prefer to be sent a link for later use, or the like).

The examples presented herein are not intended to be limiting.

Figure 6:
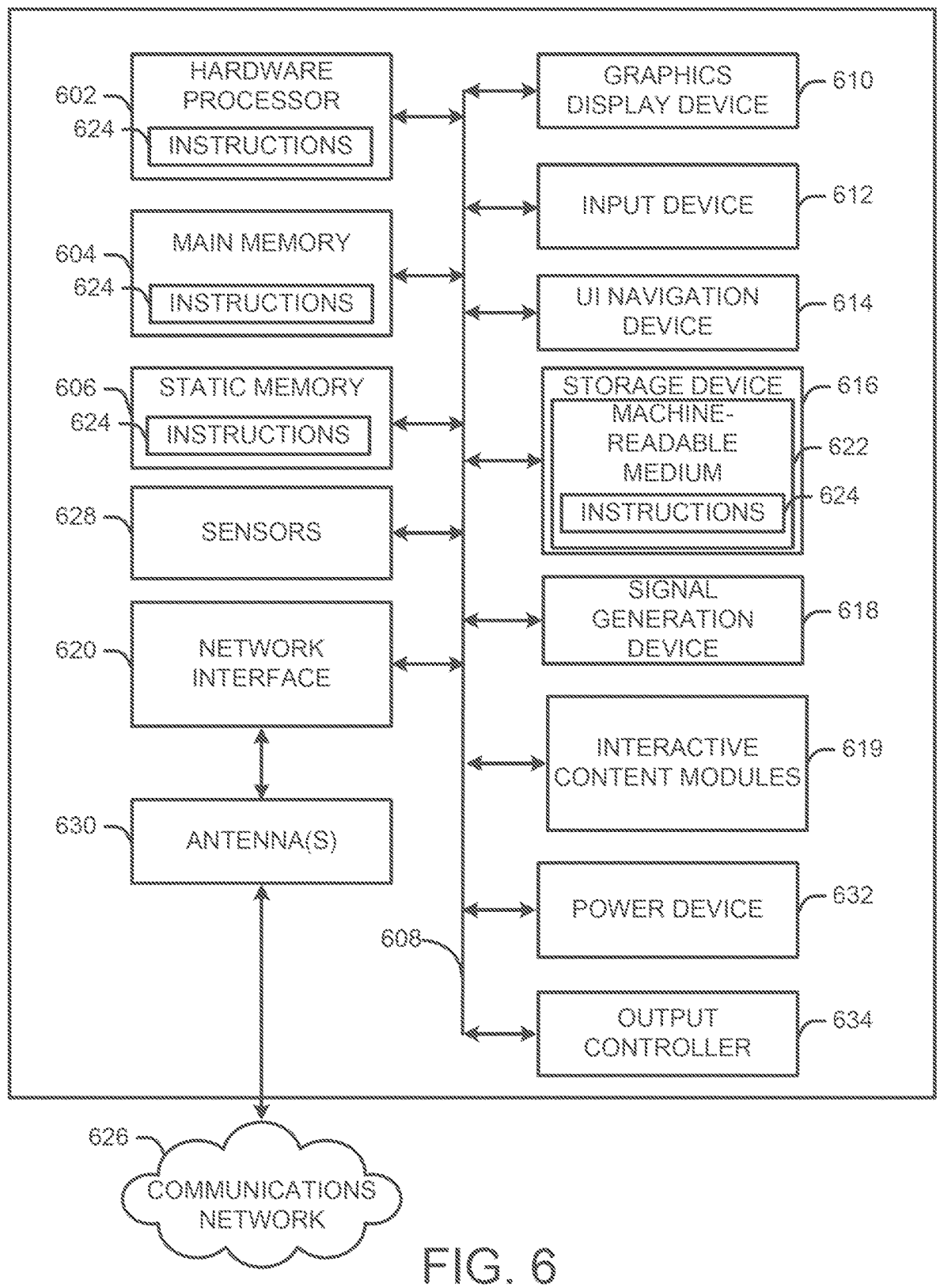
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the wearable device 104 of FIG. 1, the wearable device 106 of FIG. 1, the smart device 108 of FIG. 1, the one or more devices 110 of FIG. 1, the wearable device 204 of FIG. 2, the wearable device 206 of FIG. 2, the smart device 208 of FIG. 2, the one or more devices 210 of FIG. 2, the remote system 250 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker, emitters, etc.), interactive content modules 619 (e.g., the voice modules 252, the gesture modules 254, the input modules 256, the wrapper modules 258, and/or the content modules 260 of FIG. 2) a network interface device/transceiver 620 coupled to antenna(s) 630, and one or more sensors 628, such as photodiodes, accelerometers or other motion detection sensors, touch sensors, microphones, cameras, a global positioning system (GPS) sensor, a compass, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The interactive content modules 619 may carry out or perform any of the operations and processes (e.g., process 300 of FIG. 3, process 400 of FIG. 4, process 500 of FIG. 5) described and shown above.

It is understood that the above are only a subset of what the interactive content modules 619 may be configured to perform and that other functions included throughout this disclosure may also be performed by the interactive content modules 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for generating interactive content using non-interactive content, the method comprising:
  generating, by at least one processor of a first device, a software container associated with converting a non-interactive advertisement into an interactive advertisement by wrapping the non-interactive advertisement with code of the software container, the code comprising a voice indication of a call to action;
identifying, by the at least one processor, an audio file comprising advertising content identifying a product, wherein the voice indication of the call to action is absent from the advertising content;
generating, by the at least one processor, the interactive advertisement by adding the audio file to the software container and wrapping the audio file with the code, wherein the audio file is unmodified in the software container;
sending, by the at least one processor, the interactive advertisement to a second device for presentation;
receiving, by the at least one processor, an indication of a voice utterance;
determining, by the at least one processor, that the voice utterance is indicative of a user interaction with the interactive advertisement;
determining, by the at least one processor that the user interaction is indicative of a request to perform an action responsive to the call to action, the action comprising presenting data associated with the product;
determining, by the at least one processor, that the data is to be presented using the second device or a third device; and
sending, by the at least one processor, the data to the second device or the third device for presentation.

2. The method of claim 1, further comprising:
determining that the user interaction is indicative of a user selection of the second device or the third device with which to present the data,
wherein determining the data to present is based on the user selection.

3. The method of claim 1, further comprising:
determining a format of the data; and
determining, based on the format of the data, that the data is to be presented using the second device or the third device.

4. The method of claim 1, further comprising:
determining a user preference associated with a content format,
wherein determining the data to present is based on the user preference.

5. A method, comprising:
identifying, by at least one processor of a first device, a software container associated with converting a non-interactive advertisement into an interactive advertisement by wrapping the non-interactive advertisement with code of the software container, the code comprising a call to action;
identifying, by the at least one processor, advertising content, wherein the call to action is absent from the advertising content;
generating, by the at least one processor, the interactive advertisement by adding the advertising content to the software container and wrapping the advertising content with the code, wherein the advertising content is unmodified in the software container;
sending, by the at least one processor, the interactive advertisement to a second device for presentation;
receiving, by the at least one processor, an indication of a user interaction with the interactive advertisement;
determining, by the at least one processor, based on the user interaction, an action associated with the advertising content; and
sending, by the at least one processor, data associated with the action to the second device or a third device for presentation.

6. The method of claim 5, wherein the user interaction comprises at least one of a voice utterance, a gesture, or a touch.

7. The method of claim 5, wherein the action to present comprises a product page that describes a product advertised by the advertising content.

8. The method of claim 5, wherein the action comprises presenting a virtual shopping cart or purchase transaction page.

9. The method of claim 5, wherein the action comprises presenting a playlist of content.

10. The method of claim 5, wherein the action comprises executing a computer application executable by the second device or the third device.

11. The method of claim 5, wherein the advertising content uses a first media format, and wherein the data use a second media format different than the first media format.

12. The method of claim 5, further comprising:
determining a format of the data; and
determining, based on the format of the data, that the data are to be presented using the second device or the third device.

13. The method of claim 5, further comprising:
determining a user preference associated with a content format; and
determining the data based on the user preference.

14. The method of claim 5, further comprising:
determining that a presentation of first content was interrupted to present the interactive advertisement;
determining a media format of the first content; and
determining, based on the media format of the first content, that the data are to be presented using the second device or the third device,
wherein sending the data to the second device or the third device is based on the determination that the data are to be presented using the second device or the third device.

15. The method of claim 5, further comprising:
determining that the user interaction comprises an indication of a user selection of the second device or the third device for presentation of the data,
wherein sending the data is based on the user selection.

16. The method of claim 5, wherein an audio file or a video file comprises the advertising content, and wherein generating the interactive advertisement comprises adding the audio file or the video file to the software container.

17. A system comprising memory coupled to at least one processor, the at least one processor configured to:
identify a software container associated with converting a non-interactive advertisement into an interactive advertisement by wrapping the non-interactive advertisement with code of the software container, the code comprising a call to action;
identify advertising content, wherein the call to action is absent from the advertising content;
generate the interactive advertisement by adding the advertising content to the software container and wrapping the advertising content with the code, wherein the advertising content is unmodified in the software container;
send the interactive advertisement to a second device for presentation;
receive an indication of a user interaction with the interactive advertisement;

determine, based on the user interaction, an action associated with the advertising content; and send data associated with the action to the second device or a third device for presentation.

18. The system of claim 17, wherein an audio file or a video file comprises the advertising content, and wherein to generate the interactive advertisement comprises to add the audio file or the video file to the software container.

19. The system of claim 17, wherein the at least one processor is further configured to:

determine a format of the data; and determine, based on the format of the data, that the data are to be presented using the second device or the third device.

20. The system of claim 17, wherein the at least one processor is further configured to:

attribute the user interaction to at least one of the advertising content or the software container.

* * * * *